United States Patent [19]

Berggren

[11] Patent Number: 4,997,578

[45] Date of Patent: Mar. 5, 1991

[54] METHOD AND APPARATUS FOR DEWATERING AND SQUEEZING MATERIAL

[75] Inventor: Torsten L. Berggren, Nässjö, Sweden

[73] Assignee: Hedemora AB, Hedemora, Sweden

[21] Appl. No.: 399,480

[22] PCT Filed: Feb. 12, 1988

[86] PCT No.: PCT/SE88/00056

§ 371 Date: Oct. 18, 1989

§ 102(e) Date: Oct. 18, 1989

[87] PCT Pub. No.: WO88/06090

PCT Pub. Date: Aug. 25, 1988

[30] Foreign Application Priority Data

Feb. 18, 1987 [SE] Sweden ................................ 8700658

[51] Int. Cl.[5] .......................... B30B 9/14; B30B 9/18; C02F 11/12

[52] U.S. Cl. .................................... 210/770; 210/784; 210/798; 210/393; 210/402; 210/408; 210/414; 210/415; 100/37; 100/117; 100/145; 100/148; 162/18; 162/56; 209/250

[58] Field of Search ............... 210/770, 780, 784, 391, 210/393, 402, 408, 414, 415, 791, 798; 100/37, 117, 145, 146, 147, 148, 149, 150; 127/5, 6, 7, 43; 162/18, 56, 60, 246; 209/240, 241, 247, 250, 270, 273

[56] References Cited

U.S. PATENT DOCUMENTS

| | | | |
|---|---|---|---|
| 675,179 | 5/1901 | Wacker | 100/117 |
| 2,355,091 | 8/1944 | McDonald | 210/414 |
| 3,394,649 | 7/1968 | Kemper et al. | 700/117 |
| 3,862,594 | 1/1975 | Stolting et al. | 100/145 |
| 4,779,528 | 10/1988 | Bruke | 100/148 |
| 4,869,783 | 9/1989 | Prusas et al. | 162/18 |

FOREIGN PATENT DOCUMENTS

| | | | |
|---|---|---|---|
| 1494271 | 7/1967 | France | 100/117 |
| 56-71598 | 6/1981 | Japan | 100/117 |
| 56-89398 | 7/1981 | Japan | 100/117 |
| 84008242 | 1/1984 | Sweden . | |
| 1127727 | 9/1968 | United Kingdom | 100/117 |

*Primary Examiner*—W. Gary Jones
*Attorney, Agent, or Firm*—Pollock, Vande Sande & Priddy

[57] ABSTRACT

An apparatus for dewatering and squeezing a water containing material comprises a drum with a sieve mantle defining two co-operating drum sections, each comprising a feed screw extending therein. The first section of the drum in the feed direction is formed for dewatering of the material mainly by self-drainage. The first drum section is rotatable and is provided with means for cleaning the sieve mantle holes. The second section is formed for increased compression of the material, and has a thread height for the feed screw smaller at the outlet of the second section than at the inlet to this section.

21 Claims, 3 Drawing Sheets

METHOD AND APPARATUS FOR DEWATERING AND SQUEEZING MATERIAL

BACKGROUND OF THE INVENTION

The present invention relates to a method and an apparatus for dewatering and squeezing material in form of sludge, sediment, suspensions such as paper pulp, peat, etc.

Roller presses, disc presses, wire belt presses and screw presses are used today for dewatering and pressing materials. The three first-mentioned types are in relation to their capacity large and expensive machines, have high operation costs and are unsuitable for purifying plants and small industries. In this connection it has therefore been necessary to use some form of screw presses, however existing constructions have several disadvantages and limitations.

Enclosed drawing illustrates in FIGS. 1 and 2 two different basic principles for such screw presses.

FIG. 1 illustrates a conventional press having a sieve mantle in combination with diverging screw body and an adjustable throttle device at the outlet of the press.

When dewatering a material of the kind mentioned above the press usually is fed with a pumpable inlet concentration, meaning a range of 2% to maximum 6% dry substance. It is desirable that the concentration after the press shall be the highest possible, preferably within the range of 35% to 45%. Such a dewatering requires a compression of the material in the order of magnitude 1:10.

However, the press according to FIG. 1 has a maximum compression ratio, counted as transport volume per thread inlet/transport volume per thread outlet, in the order of magnitude 1:2 and by experience maximum 1:2,3. This means that the press must be dimensioned for the incoming volume and for that reason the end portion, where the squeezing work takes place, must be made with large dimensions. For obtaining a dewatering, for example, from 4% up to 40% concentration with a screw press having a compression ratio, for example, 1:2,3 a strong throttling must take place at the outlet of the press. This results in a compression backwards in the press resulting in friction and unnecessary energy consumption. Moreover, such a throttling in the end portion causes that the material receives tends to rotate with the screw, whereby the entire press can be blocked due to overloading.

Another disadvantage with this known screw press is, that upon incoming low material concentration, particularly when a large play exists between thread top and sieve mantle due to worn screw threads, a cloth formation consisting of fibres on the inlet side of the sieve mantle is obtained in the inlet portion. In this type of press there are no possibilities for readjustment of the play between thread top and sieve mantle.

The fact that the final squeezing in this known screw press takes place at an unecessary large diameter, which is determined by the inlet volume for the material, it is also accompanied by the disadvantage of a large moment on the screw for feeding/compression work resulting in a high energy consumption.

Due to the fact that the press must be dimensioned after the incoming volume, the disadvantage accordingly exists that the press must have large diameter and also large length. Since in a screw press considerable radial loads exist, the construction of a press shown in FIG. 1 is expensive and the operation costs are high.

The known screw press illustrated in FIG. 2 has in the outlet portion a somewhat converging sieve mantle in combination with a converging screw and at the outlet an axially operating throttle device in the form of a reciprocating piston. In this construction it is possible to achieve sufficient compression ratio. The main problem of this screw press is that the distance between screen body and sieve mantle is large at the outlet and squeezed water cannot penetrate through the thick fibre cake but is encased at the screw body. This results in that the discharged material becomes varying in concentration. Moreover, problems arise due to the fact that the water collected at the center shaft is compressed and "pushes" the material out with sharp water jets through the outlet. Due to the geometry of the device it is here difficult to arrange dwatering both radially outwards through the sieve mantle and radially inwards through a perforated center shaft.

SUMMARY OF THE INVENTION

The object of the present invention is to provide a screw press in which the disadvantages of conventional constructions are eliminated while existing advantages are maintained.

The invention relates to a method for dewatering and squeezing materials in form of sludge, sediment, suspensions such as pulp, peat, and the like, wherein the material from an inlet to an outlet is dewatered and squeezed during feeding between threads of a rotating feed screw and surrounding sieve mantle, and the method according to the invention is characterized in that the material firstly is fed through a first section between feed screw and rotating sieve mantle with dewatering through the sieve mantle during mainly self-drainage and during at least intermittent cleaning of the sieve mantle holes and thereafter is fed through a second section between feed screw and sieve mantle in this section with dewatering through the sieve mantle during increased compression of the material and with higher compression pressure at the end of the feeding through the section than at its beginning.

The invention provides an advantageous combination of the sections. A complete filling of the material in the sections is obtained thereby obtaining an axial movement of the material through both sections and eliminating sliding of the material in the feed direction and tendencies for blocking caused by rotation of the material with the feed screw. An even, continuous in-feed of the material from the first section to the second section is obtained. The rotation of the sieve mantle and the cleaning of the sieve mantle holes contribute to the achievement of these advantages, and the second section with its increased compression and its increased compression pressure affords the condition precedent for a high total compression ratio, viz. a compression ratio counted as thread volume inlet/thread volume outlet in the magnitude of 1:5 to 1:15, preferably 1:7 to 1:10.

Moreover, the invention gives a condition precedent for forming the second section with comparatively essentially less dimensions. Since just this section is subjected to large loads, this factor is important from a constructional point of view. A less diameter gives furthermore the advantage by the fact that thereby a less movement is required resulting in a lower energy consumption for the squeezing work.

In the first section, in which the dewatering mainly takes place by self-discharge and only light squeezing, the stresses on feed screw and sieve mantle are moderate, which assures the further advantage that this section can be made in relatively small dimension, and therefore at low cost. The moderate stresses also contributes to the fact that the sieve mantle in the first section can be separate and rotating. Such a rotation provides advantages in two respects. Cleaning of the sieve mantle holes can be performed with simple means, for example as in a preferred embodiment by using a spray pipe arranged outside the sieve mantle and operating with water under pressure and with intermittent function. Moreover, the sieve mantle can be driven with a relative rotation in relation to the rotation of the feed screw and furthermore the compression of the material in the second section can be varied upon variation of the rotation speed of the sieve mantle. Such a possibility for variation is advantageous since the capacity of the press and the dry content of the discharge material can be varied and furthermore the dry content of the discharge material can be kept constant when the conditions of, for example, concentration and dewatering ability of the in-coming material are varied. It shall furthermore be noted that a variable operation commonly is an expensive device and the price increases essentially faster than the effect of the drive device. However, the separate drive of the sieve mantle of the section only requires a small part of the effect for driving the feed screw and therefore the regulation is a good economic solution. In case the regulation device for driving the sieve mantle is governed on the basis of a constant movement, as well constant filling of the second section, such a regulation method also contributes to the conditions precedent for the axial movement of the material and to the achievement of a continuous pressing feeding from behind in the second section.

The invention also relates to an apparatus which is built-up for carrying out the above mentioned method. The apparatus according to the invention includes an inlet for the material to be dewatered and pressed, an outlet for the dewatered material, feeding and dewatering device for the material consisting of feed screw and surrounding sieve mantle between the inlet and the outlet, and means for rotating the feed screw, and the apparatus is characterized in that the feeding and dewatering device comprises at least two sections arranged after each other in the feed direction of the material, each provided with feed screw and sieve mantle, the first section in the feed direction being formed for mainly only dewatering by self-discharge and being connected to means for rotating the sieVe mantle in this section and to means for cleaning the sieve mantle holes, and the second section in the feed direction being formed for increased compression of the material, the thread height of the feed screw in this section being less at the outlet than at the inlet to the section.

By the configuration of the first section, an additional advantage is obtained that also after a certain wear of the threads near, contact between the thread tops and the inside of the sieve mantle can be maintained by adjusting the axial position of the sieve mantle.

In a preferred embodiment of the invention the feed screws in the two sections consist of a common feed screw through both sections. In an alternative embodiment the sections make an angle with each other and separate feed screws are arranged in the sections. The first embodiment is less expensive to manufacture, allows less complicated operation for particularly the screw and sieve mantle of the first section and requires lower energy upon equal performance. The other embodiment requires less space in length, shorter distance between the bearings for the second section, which can be of advantage in case very high squeezing pressure must be applied to the material (for example, for squeezing peat), and choice of rotation speed and rotation direction for the screw and sieve mantle of the first section independent of the screw in the second section (its rotation speed and thread pitch, respectively). For the drainage of the very large water amounts in the first section the dewatering effect can for this section be very heavily increased by rotating the seave mantle with high rotation speed (e.g. 200 rpm) and the screw with somewhat lower rotation speed (e.g. 150 rpm), utilizing the centrifugal force for increasing the drainage.

BRIEF DESCRIPTION OF THE DRAWINGS

The invention is in the following described in embodiments more in detail and with reference to the enclosed drawings, wherein.

Figure 1:
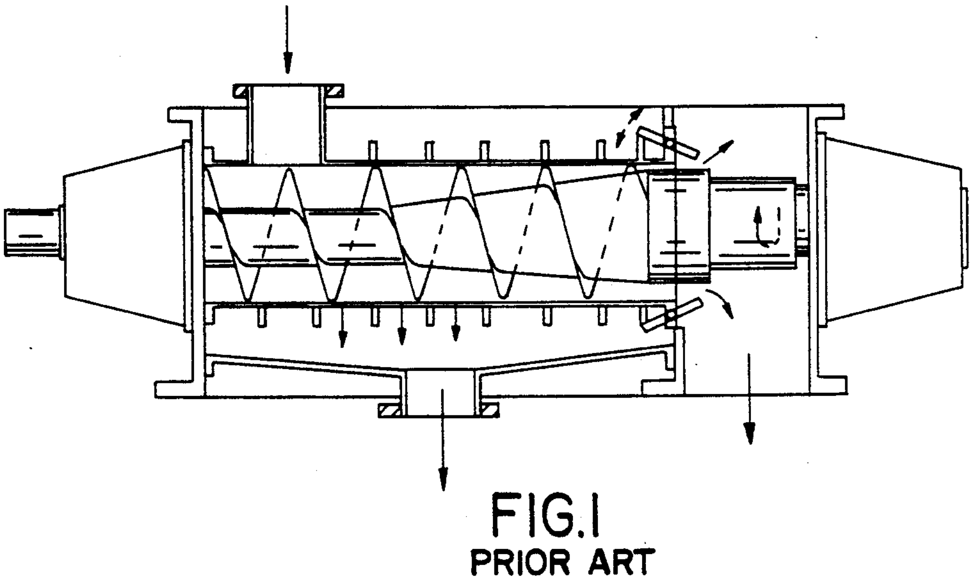
FIG. 1 PRIOR ART
FIGS. 1 and 2 illustrate two different embodiments of conventional screw presses.
Figure 2:
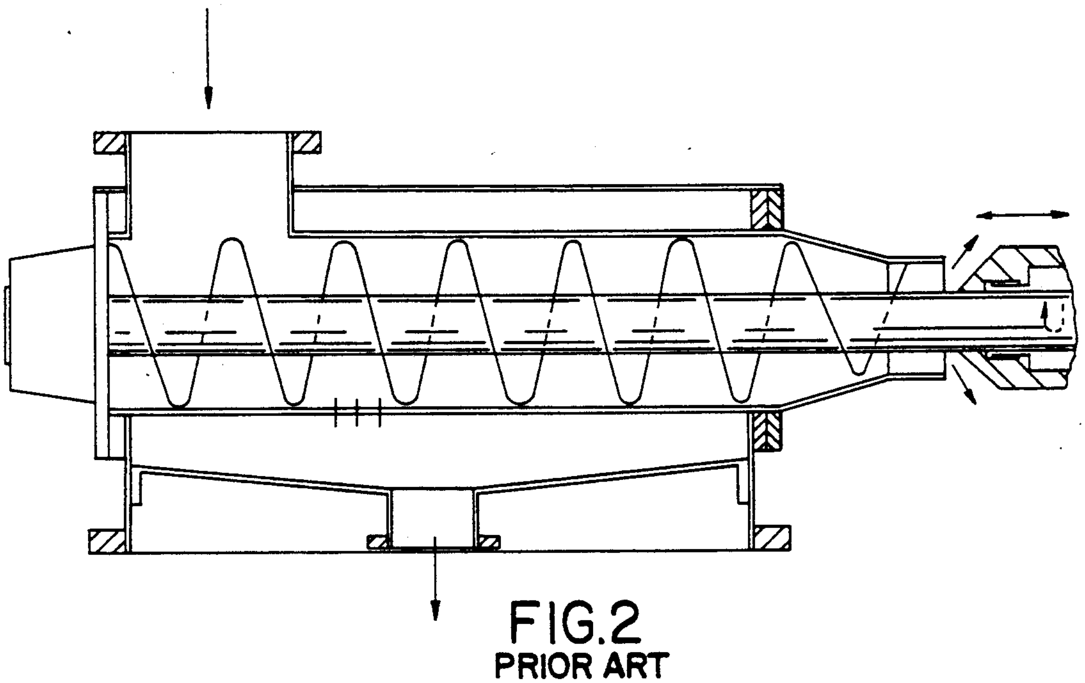
FIG. 2 PRIOR ART
Figure 3:
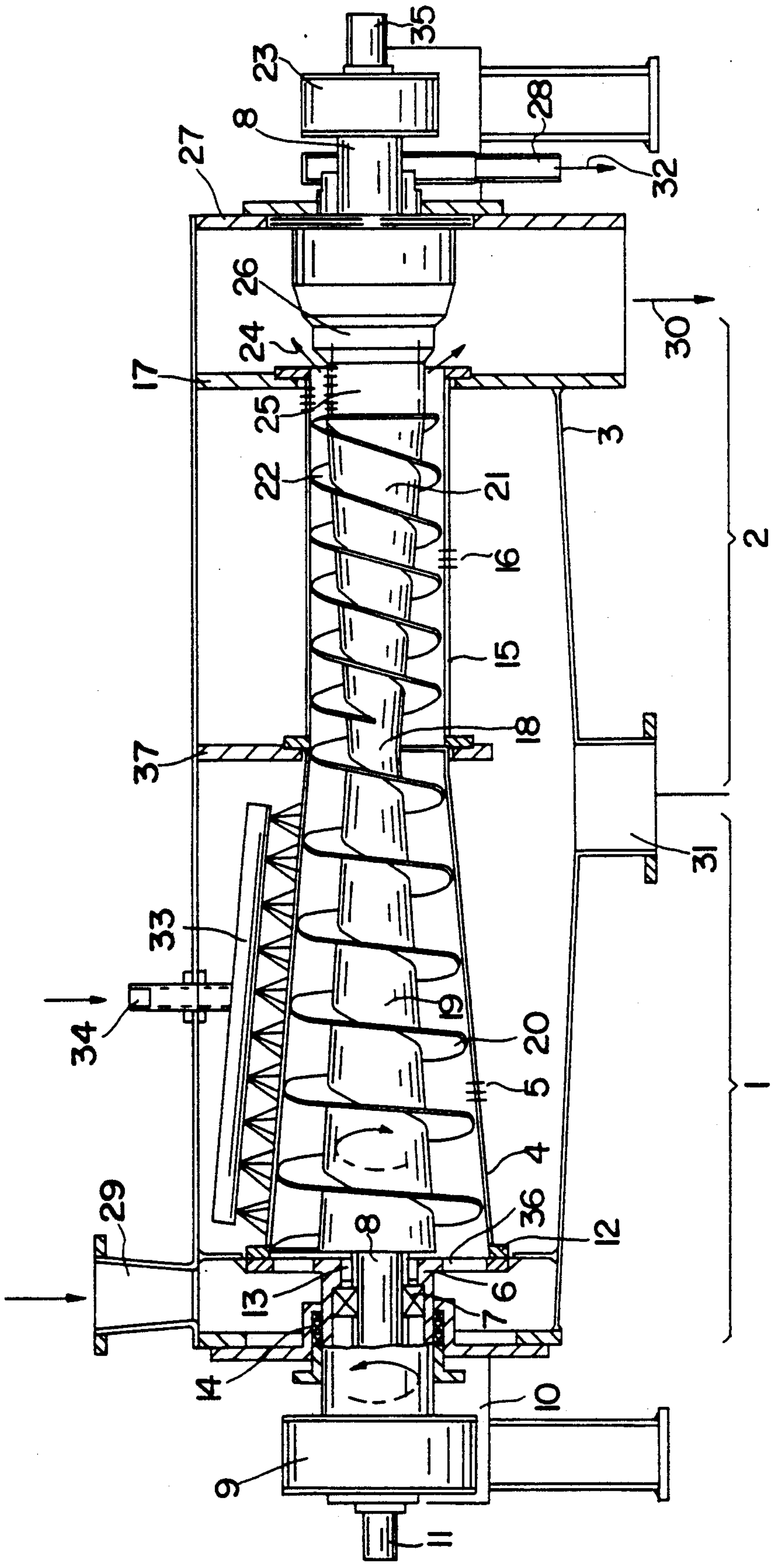
FIG. 3 is a section through one embodiment of the present invention.

The apparatus shown in FIG. 3 includes a first section or inlet section 1 for dewatering the material mainly by self-drainage and a second section or outlet section for further dewatering the material by squeezing. In the trough-formed casing 3 the two sections 1 and 2 are divided by means of a partition wall 37. A common central screw 18 is arranged through the two sections 1 and 2.

The first section 1 has in the shown embodiment a conical, and in the feed direction converging, cylindrical sieve or screen mantle 4, which is perforated with conical holes 5. The sieve mantle 4, which in this embodiment is arranged to rotate separately from the screw 18, is fastened to gable element 6 and is supported by two bearings 7 mounted on axle spindle 8. The gable element 6 is furthermore journalled in a bearing housing 9 resting on two longitudinal supporting beams 10.

The sieve mantle 4 is driven, for example, by a pivot gear mounted on axle journal 11. A removable partition wall 12 is provided for adjusting the play between thread tops and sieve mantle. Conventional sealings are arranged for sealing against the material.

The second section 2 includes a sieve mantle 15 perforated with conical holes 16. The sieve mantle 15 is fixed to the partition wall 37 and wall 17. The central screw 18 common for the sections 1 and 2 has in the section 1 a converging screw body 19 and thread 20. In section 2 the screw body 21 of the central screw diverges and is provided with thread 22. The central screw 18 has an axle 8 which in section 1 is journalled in bearing 7 and in section 2 in bearing 23.

At the outlet 24 for the material a stationary perforated sleeve 25 is arranged and also a throttling device in the form of a reciprocating cone 26 for throttling the material flow. The throttling device is attached to gable element 27 and for collecting of discharge water through the sleeve 25 a collecting casing 38 is arranged.

The material to be dewatered and pressed is supplied through inlet 29 and the pressed material is discharged through outlet 30. Outlet for the drainage water through the sieve mantles 4 and 15 takes place through pipe 31 and outlet for the drainage water through the sleeve or cylinder 25 takes place through discharge pipe 28.

Cleaning means in form of a spray tube 33 is arranged outside the sieve mantle 4 for cleaning the sieve mantle holes 5. The spray tube is fed with water under pressure through tube 34.

The central screw 18 is preferably driven by a conventional pivot gear mounted on axle pivot 35.

In the section 1, dewatering is obtained mainly only by self-drainage but also to a less part by easy squeezing, while in section 2 the real squeezing takes place. Moreover, in section 2 the thread height for the thread 22 is less at the outlet 24 of the section than at its inlet at the partition wall 37, thereby obtaining an increased squeezing effect as the dry content of the material increases. As shown, the thread height of the thread 22 continuously decreases in direction towards the section outlet 24.

The apparatus operates in the following way.

The material to be dewatered and squeezed is fed from a pump or a level box through the pipe 29 and further through holes 36. During the feeding by means of thread 20 the material, as mentioned above, is dewatered mainly by self-drainage. The compression in the section 1 is in the order of 1:2 to 1:3.5, preferably 1:3. The water passes through the sieve holes 5, is collected in trough 3 and is discharged through the pipe 31.

When the material has passed the sieve mantle 4 the thread 20 feeds the material further into the section 2. Owing to the fact that the screw body 21 in this embodiment diverges in section 2, that is, the thread height for the thread 22 decreases in direction towards the section outlet 24 since the sieve mantle 15 is cylindrical, the material is in this section subjected to a radial compression which can be in the order of magnitude of 1:2.0 to 1:3.5 and preferably can be 1:3.0.

In the end of the section 2 at the outlet 24, the material is compressed in axial direction with the aid of a counter force from the reciprocating cone or piston 26. During the final squeezing the water is discharged in two directions, outwardly through the sieve mantle 15 and also inwardly through holes in the stationary cylinder 25. The water passing through the sieve mantle 15 is collected in trough 3 and is discharged through tube 31, while the water passing through the cylinder 25 is guided into a channel around the shaft 8 and further out through the discharge pipe 28.

Drive means arranged on the pivot 35 is preferably a conventional pivot gear having constant speed rotation and drive means mounted on the pivot 11 is preferably also a conventional pivot gear but preferably provided with motor for adjustable speed rotation.

By having a relation between speed rotation for screw thread 20 and sieve mantle 4, respectively, it is possible to vary the dewatering in section 1 and also to establish a complete filling of the sections 1 and 2. Such a filling uniform in time is possible to control, for example, by sensing the movement for the drive means of the sieve mantle 4. The drive means for the pivot 11 can preferably be in the magnitude of 20% of the effect compared with the drive means for the pivot 35. This is of advantage since the cost for a variable drive increases essentially with the effect.

When operating an apparatus according to the invention, for example, the apparatus shown in FIG. 3, the high total compression ratio (e.g. in the order of magnitude of 1:10) is utilized and a mainly radial compression on the material is obtained along the whole length between screw and sieve mantle, whereby only a small degree needs to be utilized for the axial compression in the end portion of the second section, in the embodiment caused by the piston 26. Thus, the energy-requiring sliding of the material in the direction of the spiral obtained in conventional screw presses is eliminated as well as blocking caused by the fact that the material in conventional screw presses attends to rotate with the screw.

The dewatering in section 1 is made more effective in the embodiment according to the invention due to the rotation of the sieve mantle in the section. This rotation contributes to the dewatering itself and also makes it possible to continuously keep the holes in the sieve mantle clean by intermittent spraying with water under pressure from the spray tube 33. This cleaning operation makes it also possible to use considerably less holes in the sieve mantle, thereby limiting losses of dry substance in the discharge backwater.

By adjustment of a relative speed rotation between screw and sieve mantle in section 1 and also axial pressure in the end of section 2, very good conditions for flexibility is obtained and thereby an adapted range of application for the apparatus. Such a flexibility is not possible to predict by using only section 1 or only section 2 but it is first realized when using these section in co-operation in accordance with the invention.

Figure 4:
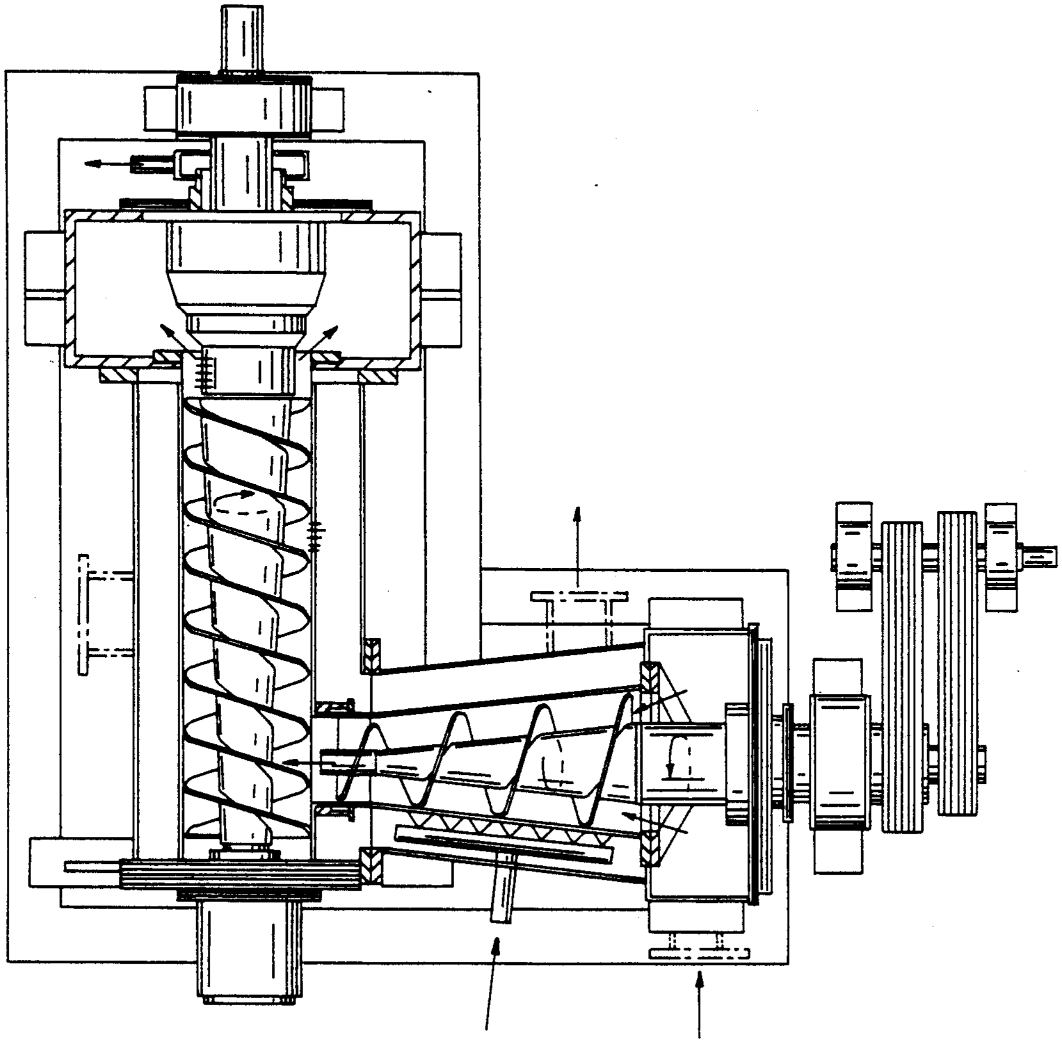
FIG. 4 is a section through another embodiment of the present invention.

The embodiment shown in FIG. 4 coincides in all essential parts with the embodiment shown in FIG. 3, disregarding that the first section and the second section make an angle with each other, as shown a right angle, that the driving of the first section is separate from the driving of the second section, and that the sections have separate outlets for dewatered water. It shall be noted that the inlets and outlets shown with dash-dotted lines are arranged perpendicular to what is shown.

The apparatus shown in FIG. 4 is more expensive in manufacture, requires more complicated drive for screw and sieve mantle of the first section and requires higher energy at equal performance compared with the apparatus of FIG. 3. However, it requires less space in length, shorter distance between bearings for the squeezing screw in the second section, which may be of advantage in case of very high squeezing pressure applied on the material (for example, for squeezing peat), and rotation speed and rotation direction for the screw and sieve mantle of the first section can be chosen independent of rotation speed and thread pitch, respectively, of the screw in the second section For the drainage of very large water amounts in the first section (low incoming concentration) the dewatering effect can considerably be increased by rotating the sieve mantle with a high rotation speed (e.g. 200 rpm) and the screw with somewhat lower rotation speed (e.g. 150 rpm), thereby utilizing the centrifugal force for making the drainage more effective.

I claim:

1. A method of dewatering and squeezing a water containing material by axially feeding said material from an inlet of a drum means constituting a sieve mantle to an outlet thereof by rotating a feed screw means extending inside said drum means in the axial direction thereof, said feed screw means and said drum means each comprising a first and a second section defining a self-drainage zone and a squeezing zone, respectively, said method comprising the steps of:

introducing said water containing material through said inlet into said first section of said drum means;

feeding said material through said self-drainage zone along a converging feeding path by rotating said first section of said feed screw means;

dewatering said material during its passage through said self-drainage zone mainly by self-drainage through said sieve mantle;

imparting to said first section of said drum means a rotational movement differing from the rotational movement caused by rotating said first section of said screw means;

at least intermittently directing jets of a cleaning liquid against said first section of said drum means during rotation thereof;

feeding said material in a partly dewatered state into said second section of said drum means;

feeding said material through said squeezing zone along a feeding path continuously decreasing in cross-section by rotating said second section of said screw means;

further dewatering said material through said sieve mantle during its passage through said squeezing zone by increasingly squeezing said material between said second section of said screw means and said second section of said drum means by exposing said material to radial compressive forces successively increasing towards said outlet; and discharging said material in a dewatered state through said outlet.

2. A method according to claim 1, further comprising the step of exposing said material to axial compressive forces by throttling said outlet.

3. A method according to claim 2, wherein said first section of said screw means and said first section of said drum means are rotated in opposite directions.

4. A method according to claim 1, wherein said first section of said screw means and said first section of said drum means are rotated in opposite directions.

5. Apparatus for dewatering and squeezing a water containing material, including:

a drum means constituting a sieve mantle;

an inlet for supplying said water containing material into said drum means;

an outlet for discharging dewatered material from said drum means;

feed screw means including core means and thread means located inside said drum means and extending in the axial direction thereof; and means for rotating said feed screw means;

said drum means comprising a first rotatable drum section and a second section located after said rotatable section in the feed direction of said material;

said feed screw means comprising a first screw section extending along said rotatable drum section and a second screw section extending along said second drum section and being located after said first screw section in the feed direction of said material;

said first drum section and said first screw section defining therebetween a self-drainage zone converging in the feed direction of said material so as to dewater said material mainly by self-drainage;

said second drum section and said second screw section defining therebetween a squeezing zone, the cross-section of which is continuously decreasing in the direction of feeding of said material towards said outlet;

means for imparting to said first drum section a rotational movement different from that of said feed screw means; and means for directing a cleaning liquid against said first drum section.

6. Apparatus according to claim 5, wherein said second drum section is fixed.

7. Apparatus according to claim 5, wherein said first screw section includes a core converging in the feed direction of said material and said second screw section includes a core diverging in the feed direction of said material.

8. Apparatus according to claim 7, wherein said first rotatable drum section has a converging shape the converging angle of which substantially corresponding to the converging angle of said core of said first screw section.

9. Apparatus according to claim 7, wherein the height of said thread means of said second screw section is continuously diminishing in the feed direction of said material.

10. Apparatus according to claim 5, wherein said first screw section and said second screw section include a common core continuously extending through said first rotatable drum section and said second drum section.

11. Apparatus according to claim 5, wherein said first rotatable drum section and said first screw section form an angle with said second drum section and said second screw section.

12. Apparatus according to claim 5, further comprising means for axially compressing said material at said outlet.

13. Apparatus according to claim 12, wherein said means for axially compressing said material comprises means for throttling said outlet.

14. Apparatus according to claim 12, wherein said outlet is an annular outlet defined by said second drum section and a threadless extension of a core of said second screw section, and said means for throttling said outlet includes an axially displaceable body slidably disposed about said extension.

15. Apparatus according to claim 14, wherein said body includes an annular frustoniconical throttling surface introduceable in said outlet by axially sliding said body along said extension.

16. Apparatus according to claim 14, wherein said extension includes drainage means adapted for radially inwardly directed drainage of said material during axial compression thereof.

17. Apparatus for dewatering and squeezing a water containing material, including:

a drum means constituting a sieve mantle;

an inlet for supplying water containing material into said drum means;

an outlet for discharging dewatered material from said drum means;

feed screw means including core means and thread means located in said drum means between said inlet and said outlet, said feed screw means including a first and a second section; and means for rotating said feed screw means;

said drum means comprising at least two sections arranged after each other in the feed direction of the material, each drum section having one feed screw section extending therethrough, the first section of the drum means arranged first in the feed direction being adapted for dewatering said material by self-drainage;

means connected to said first drum section for rotation of said first drum section;

means connected to said first drum section for cleaning said first drum section;

the second drum section arranged after said first drum section in the feed direction being adapted for increased compression of the material being dewatered, the thread height for the feed screw in said second section being smaller at said outlet than at the inlet to said second drum section;

wherein said feed screw section in said first drum section is formed with the core converging from said inlet in the direction towards said second drum section, and said feed screw section in said second drum section is formed with the core diverging in the direction towards said outlet; and wherein said first drum section has converging form with a converging angle substantially corresponding to the converging angle of the feed screw core.

18. Apparatus according to claim 17, wherein said second section of said drum means is fixed.

19. Apparatus for dewatering and squeezing a water containing material, including:

a drum means constituting a sieve mantle;

an inlet for supplying water containing material into said drum means;

an outlet for discharging dewatered material from said drum means;

feed screw means including core means and thread means located in said drum means between said inlet and said outlet, said feed screw means including a first and a second section; and means for rotating said feed screw means;

said drum means comprising at least two sections arranged after each other in the feed direction of the material, each drum section having one feed screw section extending therethrough, the first section of the drum means arranged first in the feed direction being adapted for dewatering said material by self-drainage;

means connected to said first drum section for rotation of said first drum section;

means connected to said first drum section for cleaning said first drum section;

said second drum section being fixed and arranged in the feed direction after said first drum section, said second drum section being formed for increased compression of said material, the thread height for said feed screw in said second drum section being smaller at said outlet than at the inlet to said second section.

20. Apparatus according to claim 19, wherein said first and second drum section form an angle with each other and wherein separate feed screws are arranged in each drum section.

21. Apparatus according to claim 19, wherein said cleaning means consists of a spray device for spraying water under pressure against the external side of said drum means.

* * * * *